United States Patent
Webb (10) Patent No.: US 9,544,816 B2
(45) Date of Patent: Jan. 10, 2017

(54) COMBINED FRAME OF TWO COMMUNICATION PROTOCOLS ON SAME CARRIER FOR MACHINE-TO-MACHINE AND FOR BROADBAND COMMUNICATION

(75) Inventor: William Webb, Cambridge (GB)

(73) Assignee: NEUL LTD., Cambridge (GB)

(*) Notice: Subject to any disclaimer, the term of this patent is extended or adjusted under 35 U.S.C. 154(b) by 188 days.

(21) Appl. No.: 14/126,066

(22) PCT Filed: Jun. 13, 2012

(86) PCT No.: PCT/EP2012/061173
§ 371 (c)(1),
(2), (4) Date: Feb. 21, 2014

(87) PCT Pub. No.: WO2012/171945
PCT Pub. Date: Dec. 20, 2012

(65) Prior Publication Data
US 2014/0153553 A1 Jun. 5, 2014

(30) Foreign Application Priority Data

Jun. 13, 2011 (GB) .................................. 1109829.0
Jun. 13, 2011 (GB) .................................. 1109830.8
(Continued)

(51) Int. Cl.
*H04J 3/00* (2006.01)
*H04W 28/20* (2009.01)
(Continued)

(52) U.S. Cl.
CPC ......... *H04W 28/20* (2013.01); *H04W 28/0236* (2013.01); *H04W 72/0446* (2013.01);
(Continued)

(58) Field of Classification Search
CPC ............. H04W 28/20; H04W 28/0236; H04W 72/0446; H04W 72/1215; H04W 72/1289; H04W 88/06; H04W 28/065; H04W 72/1257
(Continued)

(56) References Cited

U.S. PATENT DOCUMENTS

2007/0268884 A1* 11/2007 Kolavennu et al. .......... 370/350
2008/0159239 A1   7/2008 Odlyzko et al.
(Continued)

FOREIGN PATENT DOCUMENTS

WO   2008056023 A1   5/2008
WO   2010002219 A2   1/2010
(Continued)

OTHER PUBLICATIONS

Zubair MD Fadullah et al., "Toward intelligent machine-to-machine communications in smart grid", IEEE Communications Magazine, IEEE Service Center, Piscataway, NJ, USA, vol. 49, No. 4, Apr. 1, 2011, pp. 60-65, XP011372659.
(Continued)

*Primary Examiner* — Kwang B Yao
*Assistant Examiner* — Harun Chowdhury
(74) *Attorney, Agent, or Firm* — Slater Matsil, LLP (57) ABSTRACT

A communication device configured to communicate with a plurality of terminals via a first communication protocol and a second communication protocol, wherein both protocols organize communications into a series of frames and the frames of the first protocol are shorter than those of the second protocol, the communication device being configured to impose one or more frames according to the first protocol onto at least part of a frame according to the second protocol to form a single frame for communicating via both protocols.

20 Claims, 4 Drawing Sheets

| (30) | Foreign Application Priority Data | | |
|---|---|---|---|
| Jun. 13, 2011 | (GB) | ................................... | 1109836.5 |
| Jun. 13, 2011 | (GB) | ................................... | 1109837.3 |
| Jun. 13, 2011 | (GB) | ................................... | 1109840.7 |
| Jun. 13, 2011 | (GB) | ................................... | 1109844.9 |
| Jun. 13, 2011 | (GB) | ................................... | 1109848.0 |
| Jun. 13, 2011 | (GB) | ................................... | 1109850.6 |
| Jun. 13, 2011 | (GB) | ................................... | 1109853.0 |
| Jun. 13, 2011 | (GB) | ................................... | 1109854.8 |
| Jun. 13, 2011 | (GB) | ................................... | 1109863.9 |
| Jun. 13, 2011 | (GB) | ................................... | 1109867.0 |
| Jun. 13, 2011 | (GB) | ................................... | 1109874.6 |
| Aug. 22, 2011 | (GB) | ................................... | 1114420.1 |
| Sep. 30, 2011 | (GB) | ................................... | 1116910.9 |

(51) Int. Cl.
  *H04W 72/04* (2009.01)
  *H04W 72/12* (2009.01)
  *H04W 28/02* (2009.01)
  *H04W 28/06* (2009.01)
  *H04W 88/06* (2009.01)

(52) U.S. Cl.
  CPC ... *H04W 72/1215* (2013.01); *H04W 72/1257* (2013.01); *H04W 72/1289* (2013.01); *H04W 28/065* (2013.01); *H04W 88/06* (2013.01)

(58) Field of Classification Search
  USPC ........ 370/252, 328, 329, 338, 336, 350, 280
  See application file for complete search history.

(56) References Cited

U.S. PATENT DOCUMENTS

2009/0129367 A1* 5/2009 Bitran ............... H04W 72/1257
  370/350
2010/0135272 A1    6/2010 Dayal et al.
2011/0307612 A1* 12/2011 Junell et al. .................. 709/226

FOREIGN PATENT DOCUMENTS

WO    WO 2010002219    *    1/2010
WO         2011063813 A1        6/2011

OTHER PUBLICATIONS

William Webb, "Weightless Technology an Overview", Mar. 28, 2012, pp. 1-16, XP55030536, retrieved from internet: http://www.weightless.org/documents/download/ee575c15ed123be7c9e119d52bc48d1d4f73162892123, retrieved Jun. 20, 2012.

William Webb, "Weightless: The technology to finally realise the M2M vision", Mar. 28, 2012, XP55030535, Cambridge, UK, retrieved from internet: http://www.weightless.org/documents/download/ee575c15ed123be7c9e119d52bc48d1d4f73162892123, retrieved Jun. 20, 2012.

* cited by examiner

COMBINED FRAME OF TWO COMMUNICATION PROTOCOLS ON SAME CARRIER FOR MACHINE-TO-MACHINE AND FOR BROADBAND COMMUNICATION

The invention relates to a communication device for communicating with a plurality of terminals via a machine-to-machine network.

A wireless network may be configured to operate without having been specifically allocated any part of the electromagnetic spectrum. Such a network may be permitted to operate in so-called whitespace: a part of the spectrum that is made available for unlicensed or opportunistic access. Typically whitespace is found in the UHF TV band and spans 450 MHz to 800 MHz, depending on the country. A large amount of spectrum has been made available for unlicensed wireless systems in this frequency range.

A problem with operating in whitespace is that the available bandwidth is variable and cannot be guaranteed. These limitations are well-matched to the capabilities of machine-to-machine networks in which there is no human interaction. Machine-to-machine (M2M) networks are typically tolerant of delays, dropped connections and high latency communications.

Any network operating in the UHF TV band has to be able to coexist with analogue and digital television broadcast transmitters. The density of the active television channels in any given location is relatively low (resulting in the availability of whitespace that can be used by unlicensed systems). The FCC has mandated that systems operating in the whitespace must reference a database that determines which channels may be used in any given location. This is intended to avoid interference with the TV transmissions and certain other incumbent systems such as wireless microphones.

The whitespace database does not include information about every possible source of interference. For example, a television transmitter may be intended to broadcast to only a particular coverage area, but may in fact leak into nearby areas in which the frequencies being used by that transmitter appear, at least from the whitespace database, to be available for unlicensed use. Transmissions from major TV stations can in fact be well above the thermal noise at distances of 100 km from the station.

Although the signal from such a transmitter may not be strong enough to be reliably received by television antennas in nearby areas, it is often strong enough to cause severe interference to a whitespace network operating in those areas. This interference may affect base stations especially, particularly if they have elevated antennas (which many have in order to increase their coverage area). On nominally free channels, reception is more likely to be dominated by distant TV broadcasts than thermal noise, especially in rural regions. This interference can render many of the whitespace channels unusable or severely compromised.

Further sources of interference may include: spurious emissions from nearby TV transmitters; devices operating in other wireless networks, such as Wi-Fi devices, wireless microphones, and other unlicensed users operating in whitespace; and unintended emissions of devices that are not part of a wireless network, e.g. spurious emissions from faulty electric drills.

Another problem with the database system is that increased sun spot activity tends to create abnormal propagation conditions at UHF. These abnormal propagation conditions may render some of the information in the database irrelevant, so that the database approach becomes decreasingly robust.

Often interference is localised, so that while the ability of some terminals to receive information on one or more frequencies is negatively impacted, the other terminals in a cell may be unaffected. Terminals attached to the same base station may therefore have different communication capabilities due to extrinsic factors. In addition, some of the terminals may have intrinsically different communication capabilities due to their physical attributes like antenna type, circuitry etc. This is particularly true in M2M networks, which may be formed of cells covering a large geographical area and comprising a large number of different devices.

Another problem faced in the implementation of communication networks, particularly wireless networks, is that terminals often have power constraints. Mobile terminals are commonly battery powered and not all fixed terminals have easy access to a mains electricity supply, for example due to being located in remote or inaccessible places, and so they too often rely on batteries. One way of improving power consumption is for a terminal to enter a low power "sleep" mode whenever it is not actively engaged in communication. However, this creates a new problem if the terminal is required to rapidly "wake up" and begin unscheduled communications since it takes time to come out of sleep mode and acquire or re-engage with a network. A terminal will typically be required to receive and interpret some control information transmitted by a base station or access point before it can commence communication over a network.

The challenges facing a network operating in white space with many small, battery-powered terminals result in two requirements. First, transmissions to the terminals should preferably accommodate the poor signal quality likely to be experienced by at least some of those terminals. Second, transmissions should preferably incorporate sufficient information on a regular basis that a terminal exiting sleep mode can quickly synchronise with the network. One approach is to include in each frame a header that contains all the information that a terminal needs to synchronise with the network. Suitably this header is spread before transmission so that it can be received by terminals suffering poor signal quality. Preferably the header is spread using the highest spreading factor required by any of the terminals or supported by the base station so that all terminals are able to receive the information contained in the header. In practice, this means that the duration of the header could be over 50 ms. The frame duration should be significantly longer than this so that some capacity remains for data transmission. A suitable frame duration might be 2 seconds.

It is envisaged that whitespace can be used to implement M2M networks over large geographical areas. A wireless network infrastructure deployed over such a wide area may advantageously used to implement other forms of communication too, particularly in locations where connectivity has previously been unavailable. For example, it would be desirable to be able to offer rural broadband and M2M services from the same base station. The problem is the difference in frame rates. Broadband requires a frame duration of 50 ms or less so that the latency is kept to acceptable levels for voice and internet applications. A suitable frame duration for M2M is 2 seconds. These seem mutually incompatible.

One option would be to design separate radio systems optimised for each. The home broadband would have short frame sizes in order to achieve low latency while the M2M system would have long frame durations able to accommodate messages spread over a relatively long time period. This could be achieved by running two separate carriers from the base station: one for broadband and the other for M2M.

However, with different frame durations there will inevitably be periods when one carrier is transmitting while the other is receiving. This tends to result in self-interference at the base station making reception of weak signals very difficult. Further, there may be insufficient radio spectrum for multiple carriers and the additional equipment needed may add cost to the network.

Therefore, there is a need for a mechanism that enables a communication device to provide both broadband and M2M services.

According to a first embodiment of the invention, there is provided a communication device configured to communicate with a plurality of terminals via a first communication protocol and a second communication protocol, wherein both protocols organise communications into a series of frames and the frames of the first protocol are shorter than those of the second protocol, the communication device being configured to impose one or more frames according to the first protocol onto at least part of a frame according to the second protocol to form a single frame for communicating via both protocols.

The communication device may be configured to communicate via both protocols by transmitting the single frame using a single carrier.

The communication device may be configured to form the single frame to have a duration equal to the duration of a frame according to the second protocol.

The communication device may be configured to form the single frame to commence with at least part of a header according to the second protocol. The communication device is configured to form the single frame to commence with the entirety of the header according to the second protocol.

The communication device may be configured to form the single frame to comprise one or more time slots representing a frame according to the first protocol.

The communication device may be configured to form the single frame to comprise one or more time slots that each have a duration corresponding to the duration of an uplink or a downlink portion of a frame according to the first protocol.

The communication device may be configured to form the single frame to comprise two contiguous time slots, one representing a downlink portion of a frame according to the first protocol and the other representing an uplink portion of a frame according to the first protocol.

The communication device may be configured to allocate the time slots representing a frame according to the first protocol to communications via either the first or the second protocol.

The communication device may be configured to form the single frame to comprise time slots representing a frame according to the first protocol such that, when those time slots are used for communication according to the first protocol, a terminal capable of communicating only according to the second protocol will perceive those time slots as being allocated to another terminal for communication via the second protocol.

The communication device may be configured to form the single frame to comprise time slots representing a frame according to the first protocol such that, when those time slots are used for communication according to the second protocol, a terminal capable of communicating only according to the first protocol will perceive those time slots as being allocated to another terminal for communication via the first protocol.

The communication device may be configured to form the single frame such that the one or more time slots representing a frame according to the first protocol are comprised in a data portion of the single frame.

The communication device may be configured to form the single frame such that the entirety of the data portion comprises a series of contiguous time slots for communication according to the first protocol.

The communication device may be configured to transmit to the plurality of terminals an indication that a frame according to the second protocol has a frame according to the first protocol imposed onto it.

The communication device may be configured to form the single frame such that the portion of the frame that comprises a header according to the second protocol is not interrupted by time slots representing one or more time slots according to the first protocol.

The communication device may be configured to indicate to one or more terminals capable of communicating via the first protocol that they should ignore the part of the single frame comprising a header according to the second protocol.

The communication device may be configured to communicate with the plurality of terminals via a wireless network that operates in white space.

The communication device may be configured to communicate with the plurality of terminals via a wireless network that is configured for machine-to-machine communication.

The first protocol may be for the provision of broadband.

The second protocol may be for the provision of machine-to-machine communications.

According to a second embodiment of the invention, there is provided a method for communicating with a plurality of terminals via a first communication protocol and a second communication protocol, wherein both protocols organise communications into a series of frames and the frames of the first protocol are shorter than those of the second protocol, the method comprising imposing one or more frames according to the first protocol onto at least part of a frame according to the second protocol to form a single frame for communicating via both protocols.

According to a third embodiment of the invention, there is provided a communication terminal configured to communicate via a machine-to-machine communication protocol and an internet communication protocol.

The communication terminal may be configured to communicate via the Weightless protocol.

The communication terminal may be configured to communicate via an IEEE 802.11 protocol.

The communication terminal may be configured to operate as an access point for communications under the internet protocol.

The communication terminal may be configured to communicate data according to the internet protocol with a communication device that forms part of the machine-to-machine network.

The communication terminal may be configured to communicate data according to the internet protocol with a communication device that operates as a base station of the machine-to-machine network.

The communication terminal may be configured to communicate data according to the internet protocol by means of a frame configured to accommodate communications according to both the machine-to-machine protocol and the Internet protocol.

For a better understanding of the present invention, reference is made by way of example to the following drawings, in which.

One or more embodiments of the invention relate to a mechanism and associated communication device for mixing applications with different data rate and latency requirements on the same wireless technology in an efficient manner.

A communication device may be configured to communicate with a plurality of terminals by means of a series of periodic communications having a predetermined structure. A single instance of that periodic communication structure may be termed a "frame". A typical frame may start with a preamble and end with an uplink section.

A communication device may also be configured to communicate via two different communication protocols, which both organise communications into a series of frames. The frames of the first protocol may be shorter than those of the second protocol. The communication device may be configured to impose one or more frames according to the first protocol onto at least part of a frame according to the second protocol. If each protocol is communicated via a different carrier, superimposing the frames in this may advantageously increase the isolation between signals communicated according to the two protocols. Superimposing the frames in this way may also be used advantageously to accommodate both protocols onto a single carrier.

Another way of viewing this may be that the frames of the first protocol form the underlying frame structure, so that the frame rate is predominantly that of the first protocol. Frames according to the second protocol may be superimposed on this underlying frame structure. In practice, this means that the underlying frame structure will periodically be interrupted the header of a frame according to the second protocol. Often the header will be allocated a continuous downlink period, causing latency to periodically increase to a manageable level for terminals communicating via the first protocol.

In one specific example, the applications to be mixed may be broadband and machine-to-machine (M2M) communications. Broadband requires high data rates (many Mbits/s) and low latency. Ideally, there should be less than 50 ms between transmitting a request for data and receiving that data. M2M communication requires much lower data rates (typically 10 kbits/s) and can tolerate very long latency (many seconds). For a machine-to-machine network operating in whitespace, a suitable frame duration might be of the order of 2 seconds. For a home broadband network, a suitable frame duration might be 50 ms.

The proposed solution is to superimpose the high frame rate (eg 20 Hz, or 50 ms frame duration) needed for broadband applications on top of at least part of each frame transmitted at the slower frame rate (eg 0.5 Hz or 2 seconds frame duration) needed for M2M communications.

One or more embodiments of the invention will now be described with specific reference to a wireless network in which the communication device is a base station. This is for the purposes of example only and it should be understood that the broadcast mechanisms described herein may be implemented in any suitable communication device, irrespective of what particular role that device plays within the network.

Example of an M2M Network

Figure 1:
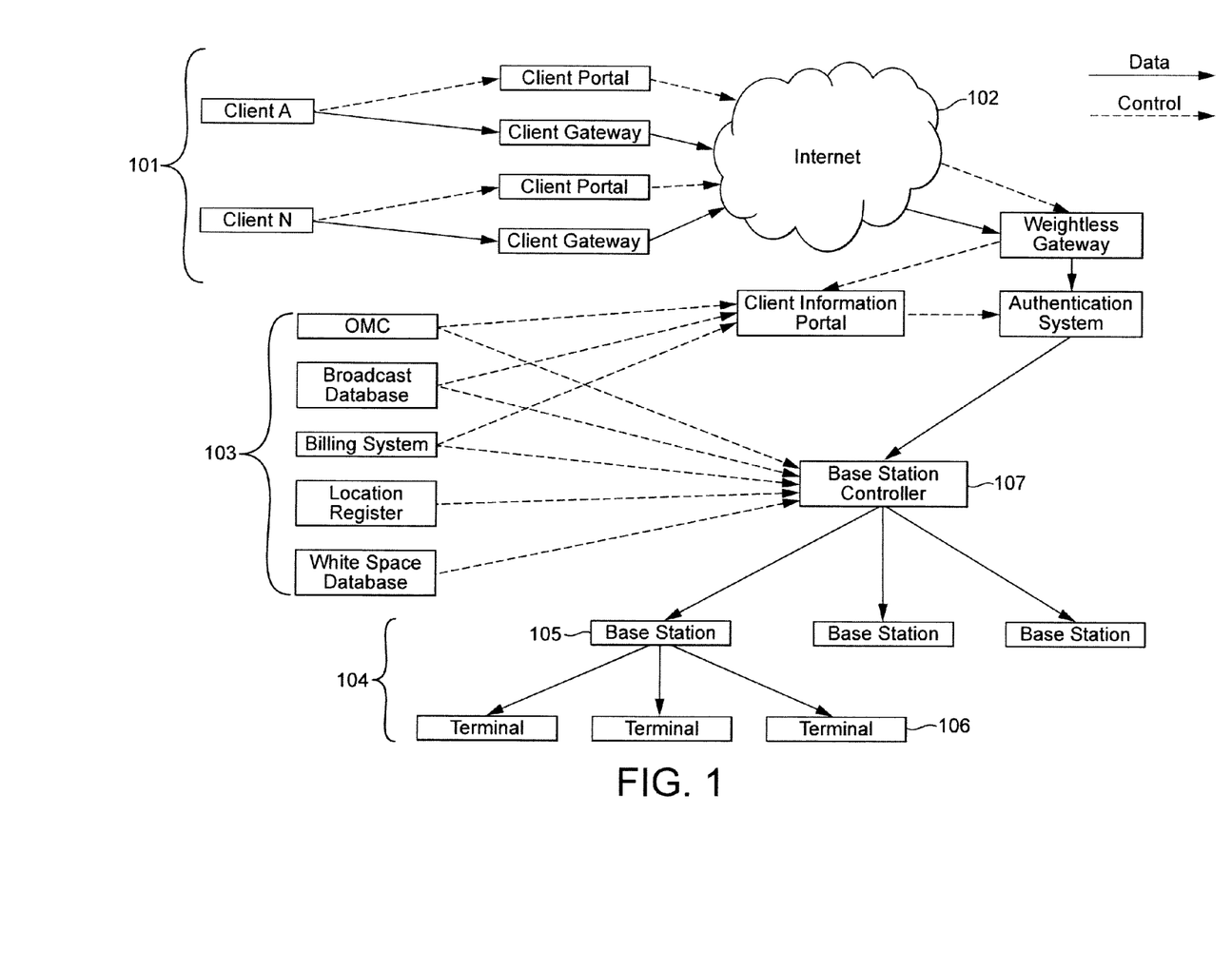
FIG. 1 shows an example of a machine-to-machine network.

An example of a wireless network is shown in FIG. 1. The network, shown generally at 104, comprises one or more base stations 105 that are each capable of communicating wirelessly with a number of terminals 106. Each base station may be capable of communicating over the Internet 102, either directly or via intermediate network devices such as base station controller 107. Each base station may also be arranged to communicate with terminals that are located within a particular geographical area or cell. The base stations transmit to and receive radio signals from the terminals. The terminals are suitably entities embedded in machines or similar that communicate with the base stations. Suitably the wireless network is arranged to operate in a master-slave mode where the base station is the master and the terminals are the slaves.

The base station controller 107 is a device that provides a single point of communication to the base stations and then distributes the information received to other network elements as required. That is, the network is based around a many-to-one communication model. The network may be arranged to communicate with a client-facing portion 101 via the internet 102. In this way a client may provide services to the terminals via the wireless network.

Other logical network elements shown in this example are:

Core network. This routes traffic information between base stations and client networks.

Billing system. This records utilisation levels and generates appropriate billing data Authentication system. This holds terminal and base station authentication information.

Location register. This retains the last known location of the terminals.

Broadcast register. This retains information on group membership and can be used to store and process acknowledgements to broadcast messages, Operations and maintenance centre (OMC). This monitors the function of the network and raises alarms when errors are detected. It also manages frequency and code planning, load balancing and other operational aspects of the network.

Whitespace database. This provides information on the available whitespace spectrum.

Client information portal. This allows clients to determine data such as the status of associated terminals, levels of traffic etc.

In practice, many of the logical network elements may be implemented as databases running software and can be provided on a wide range of platforms. A number of network elements may be physically located within the same platform.

A network such as that shown in FIG. 1 may be used for M2M communications, i.e. communications that do not involve human interaction. M2M communications are well-matched to the limitations of operating in whitespace, in which the bandwidth available to the network may vary from one location to another and also from one time instant to the next. As the network does not have any specific part of the spectrum allocated to it, even unallocated parts of the spectrum may become unavailable, e.g. due to a device in the vicinity that is operating outside of the network but using the same part of the spectrum. Machines are able to tolerate the delays and breaks in communication that can result from these varying communication conditions. Services can be provided in non real-time; low latency is not important as long as data is reliably delivered.

Example of an M2M Frame

Figure 2:
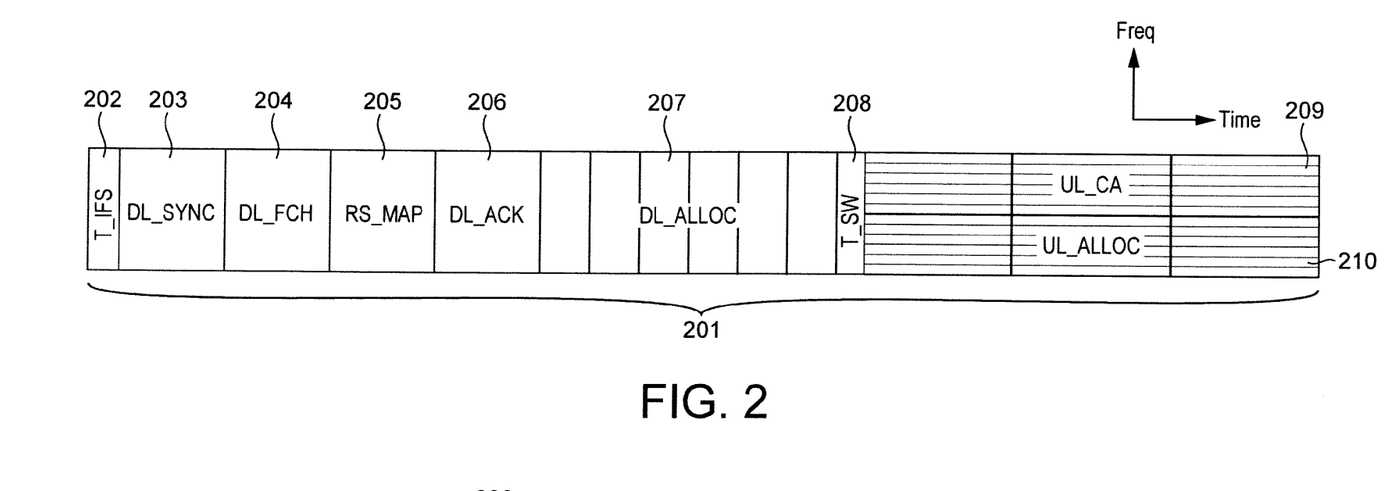
FIG. 2 shows an example of a frame structure for M2M communications.

In one embodiment, the network may use medium access control (MAC) to share the same radio resource between multiple terminals. An example of a suitable frame structure is shown in FIG. 2. The frame (shown generally at 201) comprises time to ramp-up to full output power 202 (T_IFS), a synchronisation burst 203 (DL_SYNC), an information field providing the subsequent channel structure 204 (DL_FCH), a map of which information is intended for which terminal 205 (DL_MAP), a field to allow acknowledgement of previous uplink transmissions 206 (DL_ACK) and then the actual information to be sent to terminals 207 (DL_ALLOC). There is then a guard period for ramp-down of the downlink and ramp-up on the uplink 208 (T_SW), followed by the allocated uplink data transmissions 210 (UL_ALLOC) in parallel with channels set aside for uplink contended access 209 (UL_CA).

Each frame may be broadly divided into control fields, such as DL_SYNC, DL_FCH, DL_MAP and DL_ACK, which impart information to the terminals about the function of the network and the arrangement of the frame, and data fields, such as DL_ALLOC, UL_ALLOC and UL_CA that are used to transfer actual information between the base station and the terminals. Preferably the base station transmits the control fields using a communication mode that is appropriate for all of the terminals that the frame is intended for, so that (as far as possible) all of the terminals who wish to receive that control information are capable of doing so. This may be achieved by selecting the mode corresponding to the lowest data rate required by any of the terminals for which the frame is intended or more generally for any of the terminals in the cell, or it may be achieved by selecting the mode corresponding to the lowest data rate that the base station is capable of transmitting with. For some modes, the mode corresponding to the lowest data rate will be that which employs the highest spreading factor.

It may be particularly advantageous for one or more of the control fields to be transmitted at the lowest data rate supported by the base station. This will assist all terminals to receive those fields, even those that have not yet attached and for which the base station has no information.

The mode used for communicating in the data fields of the frame may be adapted to the capabilities of the particular terminal involved in that communication. The DL-ALLOC channels, in particular, are preferably transmitted in the mode agreed with the terminal previously. It is therefore possible for the mode used in the DL-ALLOC portion of the frame to vary from symbol to symbol. The uplink CA slots, on the other hand, may be transmitted using the lowest data rate supported in the cell. The UL_ALLOC channels are preferably transmitted using the mode pre-agreed with the terminal.

The DL_FCH may include information to enable the terminals to determine the hopping sequence. The DL_FCH may include a list of the frequencies that are included in the sequence. If the frequency hopping sequence is just an ascending/descending sequence, one efficient way of communicating it is by means of a channel map, with a bit being set if the channel is in use in the base station. The DL_FCH may also include a MAC Frame count (16-bit) enabling terminals to determine where the base station is in its hopping pattern. Finally, the DL_FCH may indicate the spreading factor used for transmitting the DL_MAP.

The DL_MAP informs terminals as to whether there is any information for them in the frame and whether they have an uplink slot reserved for them to transmit information. It comprises a table of terminal identities, the number of slots that their information is spread over and the transmission mode and spreading factors used. All terminals monitoring the frame decode this field to determine whether they need to decode subsequent information. The length of the DL_MAP may be included as part of the DL_FCH, as may the spreading factor used to transmit it. The base station may select the spreading factor for the DL_MAP to be that corresponding to the lowest bit rate required by terminals connected to the base station or that corresponding to the lowest bit rate supported by the base station. A terminal can determine the position of its assigned slots from the DL_MAP by adding up the number of slots allocated in prior rows in the table.

On the uplink the slots may be numbered from 0 to n on the first FDMA channel, then on the subsequent FDMA channel and so on. The terminal can determine how many slots there are each channel from the length of the frame available for the uplink (that remaining after completion of the downlink) divided by the length of each slot. If a terminal has data requiring multiple slots it would normally be given these consecutively on the same carrier as this both simplifies the terminal transmission and minimises the control information required to describe the slot location. However, it is possible to give the terminal multiple allocations on different carriers (so long as they are not simultaneous) to achieve frequency hopping on the uplink.

The base station may be configured to communicate with one or more terminals in the cell at regular, predetermined intervals. Scheduling communications in this way may be advantageous in machine-to-machine networks, in which the terminals are often devices having small batteries. By scheduling communications at regular, predetermined intervals, terminals can enter a sleep mode between communications and only wake-up when a communication is expected.

Combination of M2M and Broadband

Figure 3:
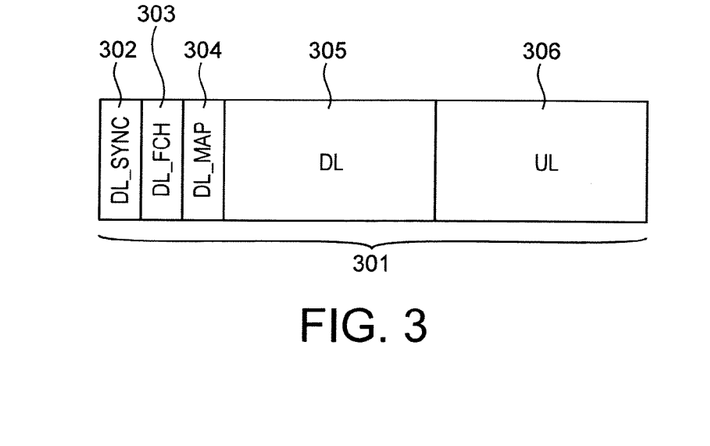
FIG. 3 shows an example of a frame structure for broadband communications.

A typical broadband frame is similar to the M2M frame described above in that it contains both a downlink and an uplink period. An example of a broadband frame is shown in FIG. 3. The frame is shown generally at 301. The downlink starts with a synchronisation field (DL_SYNC: 302), followed by a field providing information on the parameters in use in the network (DL_FCH: 303) and a table setting out the allocation of resources in the remainder of the frame to terminals (DL_MAP: 304). This combination of DL_SYNC, DL_FCH and DL_MAP is collectively called the "header information". The remainder of the downlink (305) and all the uplink (306) is then used for the transmission of data to and from the terminals. In a broadband application with 50 ms frames, the header information is usually transmitted at a high bit rate. The broadband header will typically last for 1 to 2 ms. In an M2M system, with lower data rates achieved through spreading, the header will typically last between 20 ms and 200 ms of the 2 second frame (depending on the number of allocations to be signalled in the DL-MAP field).

Figure 4:
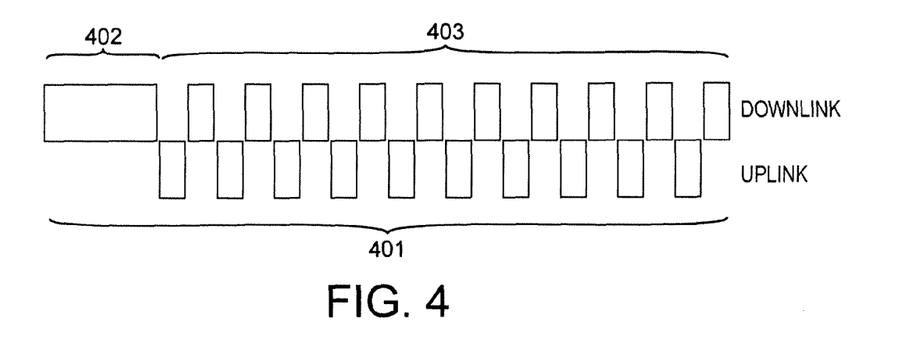
FIG. 4 shows an example of a combined frame for M2M and broadband communications.

The M2M and broadband frames may be combined by blending the two frame rates together. This may be achieved by superimposing one or more broadband frames on at least part of every M2M frame. An example of a combined frame is shown in FIG. 4. The combined frame is shown generally at 401. The frame is divided into header 402 and data portions 403 in the same way as a normal M2M frame. The header section of the M2M frame preferably remains unchanged so that M2M terminals still receive the information they require, particularly when waking from sleep mode. By leaving the M2M header unchanged, it can be transmitted in full and at its normal data rate. One or more broadband frames may then be superimposed on the data portion of the M2M frame. In FIG. 4, the entirety of the data portion of the M2M frame has had broadband frames (404) superimposed upon it. As a result, the data portion comprises a continuous sequence of time slots that alternate between uplink and downlink. Each uplink-downlink slot pair may be used as a single broadband frame. This results in a combined frame consisting of a normal M2M header followed by a series of 25 ms time slots that may alternately be allocated to uplink or downlink communications.

An alternative to the arrangement shown in FIG. 4 is for only part of the M2M header to be transmitted uninterrupted by broadband frames. The length of the M2M header is variable and largely dependent on the length of the DL_MAP. Broadly speaking, the length of the M2M header may be between 20 and 200 ms. Therefore, it may sometimes be preferable to superimpose one or more broadband frames onto the header section of the M2M frame, in addition to the data section. The downlink section of these broadband frames may be used to transmit the remainder of the header, with the uplink section being available for broadband communications. Essentially, this results in the M2M header being "punctured" with 25 ms uplink broadband slots.

Rather than viewing the combined frame as an M2M frame on which broadband frames have been imposed, it is also possible to view the underlying structure as being formed from the 50 ms broadband frames. As much of the 2 second M2M frame is then overlaid on that underling structure as possible. (Which view of the combined frame is more appropriate depends on whether one is viewing the frame from the point of view of an M2M device or a broadband device. This is described in more detail below). From this viewpoint, the M2M application takes over one or more of the broadband downlink bursts to transmit its header information. At the start of an M2M frame, the entire broadband downlink is suitably used for transmission of the M2M header. Preferably, no broadband header information is included within this burst. Depending on the length of the M2M header, a number of consecutive broadband frames might be used. All of these broadband frames may be dedicated to the downlink to enable transmission of the header. This means that no uplink time is provided in these frames so that effectively the TDD (time division duplex) split becomes 100% downlink. Alternatively, the combined frame may revert to the uplink-downlink split of a usual broadband frame. As before, this results in the M2M header being "punctured" with 25 ms uplink broadband slots.

The timings of a typical 2 second combined frame are as follows. The first 25 ms downlink burst may contain the M2M synchronisation header (2.5 ms), the DL_FCH (max 6.9 ms) and as much of the RS_MAP (max 392 ms, but typically much less than this) as possible. There follows a 25 ms slot that is designated to the uplink. This 25 ms slot may be converted to the downlink and used to transmit the remainder of the RS_MAP, or it may be used for uplink broadband communications. The next 25 ms downlink would either be a continuation of the M2M RS_MAP (if needed) or would revert to the broadband format.

If the combination of the broadband and M2M frames extends into the header, so that the header is "punctured" by one or more 25 ms uplink broadband slots, those uplink slots would possibly not be of value to any user unless the preceding downlink burst contains broadband uplink assignment information. Once the M2M header transmission is complete, the normal broadband burst structure is resumed with normal broadband headers.

The data portion of the combined frame can be allocated to either M2M or broadband communications. Each downlink-uplink slot pair appears to be a conventional broadband frame. When a downlink-uplink slot pair is used for broadband communication, the broadband header is suitably transmitted at the commencement of the downlink slot. For M2M communications, each slot appears to be a conventional timeslot for M2M communication with the limitation that each slot is only 25 ms long.

The base station preferably knows in advance what the TDD arrangements of the broadband transmission will be over the duration of an M2M frame. It is configured to schedule M2M downlink transmissions during those periods when there will be downlink broadband frames but in such a manner that the frame will be appropriately shared between broadband and M2M traffic. Preferably the base station is configured to schedule the M2M traffic intelligently so that it does not block a number of consecutive 25 ms uplink or downlink bursts and thus increase the latency excessively for the broadband user.

The base station is configured to signal in both the broadband header and the M2M header that this is a "mixed" transmission so that the devices behave appropriately.

Some changes to the operation of the broadband and M2M devices should also be made to implement this scheme.

From the perspective of a broadband terminal, the combined frame will appear to be a conventional series of broadband frames interrupted with periods when the broadband terminal cannot transmit or receive data. The broadband terminal may be configured to determine from the broadband headers that the terminal is in a mixed communication environment. The broadband terminal is preferably configured to determine from this that it will periodically receive downlink frames that do not have the normal broadband synchronisation information because they are dedicated to the M2M header. The broadband terminals may be configured to ignore these frames. Alternatively, the broadband terminal may attempt to read some or all of those frames in case they contain broadband allocation information for the following uplink.

As the broadband terminals will not be able to transmit or receive data during the M2M header, latency will temporarily increase. Given this increase in latency only occurs for between 50 to 200 ms every 2 seconds, it will generally be acceptable. If the M2M header is only allocated one broadband frame (either because the header is short or because the header is being punctured by broadband frames) broadband latency will only increase from 50 ms to 100 ms once every 2 seconds.

Broadband terminals will perceive frames that are allocated to M2M communications in the data section of the frame as simply being broadband frames allocated to other terminals.

Figure 5:
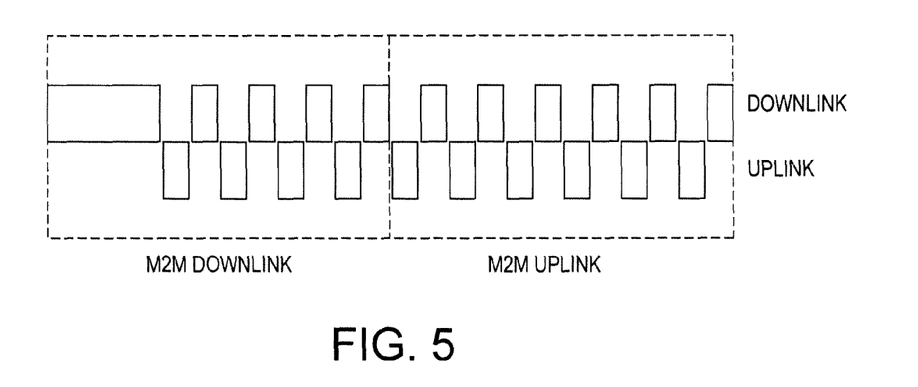
FIG. 5 shows an example of a combined frame for M2M and broadband communications with separate uplink and downlink sections.

From the perspective of an M2M terminal, the combined frame appears as a conventional M2M frame but with the header "punctured" with a 25 ms uplink, which it should ignore. Of course, if the M2M header is transmitted uninterrupted, this is unnecessary and the header will appear as normal to the M2M terminal. After the header, resource scheduling can be used to "hide" the puncturing bursts. The M2M terminal simply perceives the broadband frames as being timeslots that have been allocated to other terminals. The base station may be configured to assign M2M terminals downlink assignments during the first 1 second or so of the combined frame and assign uplink assignments for the second 1 second or so. This is shown in FIG. 5. The length of each assignment would need to be less than or equal to 25 ms (assuming a total broadband frame duration of 50 ms). This arrangement requires the least changes to the terminal but potentially loses half the capacity (if the broadband terminals are not communicating) because only half of the 25 ms burst slots are usable by the M2M terminals. Alternatively, the base station may be configured to use the RS_MAP to mix uplink and downlink within the 2 second burst (rather than having separate uplink and downlink sections in the M2M frame). This would require a more complex structure to the RS_MAP but is possible.

This approach enables broadband and M2M to be mixed together without a significant penalty to either. If one broadband carrier and one M2M carrier are available at the same base station, this approach can be used to increase the isolation between those two signals. If two separate carriers are not available, or are unsuitable for a particular application, this approach may be used to advantageously communicate via both protocols using the same carrier.

Figure 6:
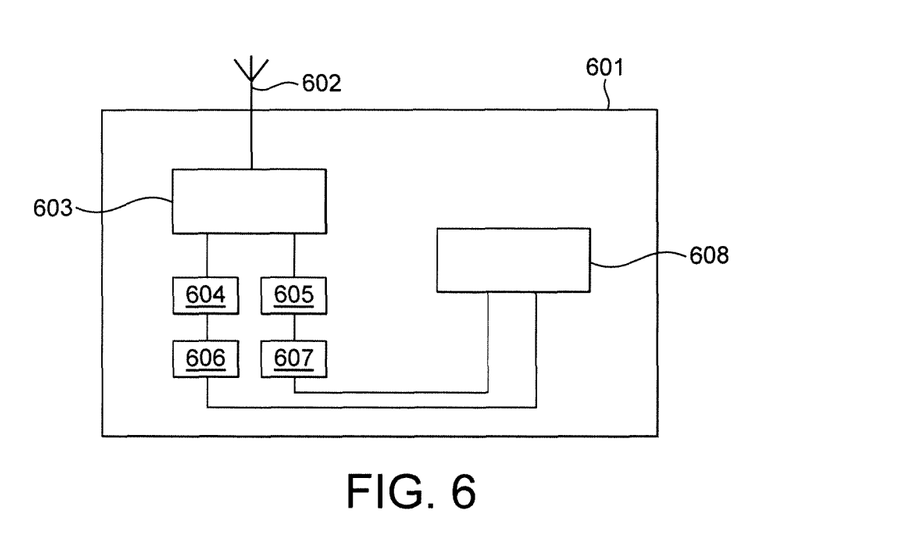
FIG. 6 shows an example of a communication device.

An example of a communication device is shown in FIG. 6. The communication device, shown generally at 601, is configured to communicate via both a broadband and an M2M network using a single carrier. The communication device comprises an antenna 602 connected to an overall communication unit 603. Communication unit 603 is further connected to units configured for broadband and M2M communication, specifically M2M communication unit 604, broadband communication unit 605, M2M control unit 606 and broadband control unit 607. The respective control units may be configured to determine what data should be communicated when, and to which terminals. The respective communication units may be arranged to generate some or all of the data to be transmitted via each respective network. The communication units are suitably configured to generate the required M2M and broadband headers. The control unit 608 preferably has overall responsibility for communicating via the combined frames, including scheduling of communications via both protocols. The control unit may also ensure that the mixed nature of the communications is indicated to the appropriate terminals.

One or more communication terminals may be capable of communicating via both protocols in addition to the base station. So, one or more terminals may have both M2M and broadband capability. In one particularly advantageous embodiment, an M2M terminal may be capable of acting as a WiFi access point. A user would therefore be able to establish a WiFi network in their home by using an M2M terminal with WiFi functionality. The terminal may be similar to a conventional Wi-Fi access point in being arranged to communicate wirelessly with WiFi enabled devices via one interface and connect to the Internet via a second, wired interface. Such a terminal would differ from a conventional access point in having M2M functionality and WiFi functionality collocated in the same device. Alternatively, the terminal may be configured to communicate wirelessly via both interfaces. For example, the terminal may communicate with WiFi enabled devices in its environment via the IEEE 802.11 protocol and transfer the relevant data to and from an M2M base station via the combined communication frame described above. The terminal may thus be configured to pass Internet communications between the base station (which will usually have its own, wired connection to the Internet) and WiFi devices in its locality.

Figure 7:
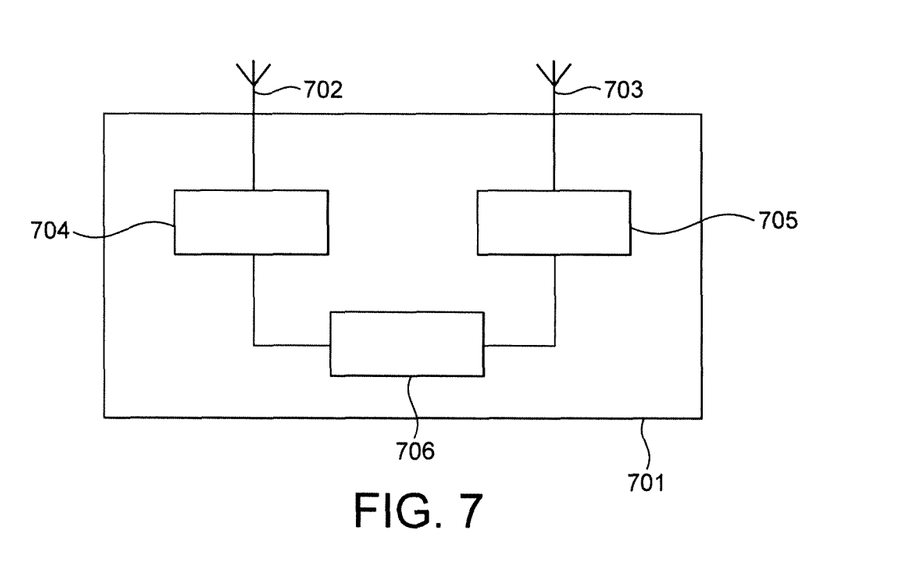
FIG. 7 shows an example of a communication terminal.

An example of a communication terminal configured to act as both an M2M terminal and a WiFi access point is shown in FIG. 7. The terminal is shown generally at 701 and comprises two antennas 702, 703 and associated radios 704, 705 for M2M and WiFi communications respectively. The terminal further comprises a control unit 706 for controlling both radios and transferring data etc from one radio to the other.

The apparatus shown in FIGS. 6 and 7 are shown illustratively as comprising a number of interconnected functional blocks. This is for illustrative purposes and is not intended to define a strict division between different parts of hardware on a chip. In practice, the communication device and terminal preferably use a microprocessor acting under software control for implementing the methods described herein. In some embodiments, the algorithms may be performed wholly or partly in hardware.

One or more embodiments of the invention have been described above with specific reference to a situation in which one protocol is for home broadband and the other protocol is for M2M communications. This is for the purposes of example only and it should be understood that the principles described herein may be advantageously used to combine communications according to any two protocols having different frame durations into a single combined frame.

A suitable protocol for M2M communications is the Weightless protocol. A suitable protocol for internet communications is IEEE 802.22. However, whatever protocol is used, the principles described herein are not limited to the specific examples described above in which the duration of one frame is 2 seconds and the duration of the other is 50 ms. The principles described herein may be advantageously used to combine two frames of any length. However, one or more embodiments of the invention may be advantageously used to combine together two different frames differing in length by a multiple of 10 or more, a multiple of 25 or more, or a multiple of up to 40.

The applicants hereby disclose in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems discloses herein, and without limitation to the scope of the claims. The applicants indicate that aspects of the present invention may consist of any such feature or combination of features. In view of the foregoing description it will be evident to a person skilled in the art that various modifications may be made within the scope of the invention.

The invention claimed is:

1. A communication device comprising:
   a processor;
   a non-transitory computer readable medium connected to the processor and having stored thereon instructions that, when executed, cause the processor to:
      communicate with a plurality of terminals via a first communication protocol and a second communication protocol, wherein both protocols organize communications into a series of frames and frames of the first protocol are shorter than those of the second protocol;

impose two or more frames according to the first protocol onto at least part of a frame according to the second protocol to form a single frame for communicating via both protocols;

form the single frame with one or more time slots representing the two or more frames according to the first protocol;

allocate the time slots representing a frame according to the first protocol to communications via either the first or the second protocol;

create a map in the single frame including a map having information describing an allocation of resources in the single frame to each of the plurality of terminals; and transmit, within the single frame, data according to the first protocol and the second protocol.

2. The communication device as claimed in claim 1, wherein the instructions causing the processor to transmit data comprise instructions that, when executed, cause the processor to communicate via both protocols by transmitting the single frame using a single carrier.

3. The communication device as claimed in claim 1, wherein the single frame has a duration equal to the duration of a frame according to the second protocol.

4. The communication device as claimed in claim 1, wherein the instructions causing the processor to form the single frame comprise instructions that, when executed, cause the processor to form the single frame to commence with at least part of a header according to the second protocol.

5. The communication device as claimed in claim 1, wherein the instructions causing the processor to form the single frame comprise instructions that, when executed, cause the processor to form the single frame with one or more time slots that each have a duration corresponding to the duration of an uplink or a downlink portion of a frame according to the first protocol.

6. The communication device as claimed in claim 1, wherein the instructions causing the processor to form the single frame comprise instructions that, when executed, cause the processor to form the single frame with two contiguous time slots, one representing a downlink portion of a frame according to the first protocol and the other representing an uplink portion of a frame according to the first protocol.

7. The communication device as claimed in claim 1, wherein the instructions causing the processor to form the single frame comprise instructions that, when executed, cause the processor to form the single frame with time slots representing a frame according to the first protocol such that, when those time slots are used for communication according to the first protocol, a terminal capable of communicating only according to the second protocol will perceive those time slots as being allocated to another terminal for communication via the second protocol.

8. The communication device as claimed in claim 1, wherein the instructions causing the processor to form the single frame comprise instructions that, when executed, cause the processor to form the single frame with time slots representing a frame according to the first protocol such that, when those time slots are used for communication according to the second protocol, a terminal capable of communicating only according to the first protocol will perceive those time slots as being allocated to another terminal for communication via the first protocol.

9. The communication device as claimed in claim 1, wherein the instructions causing the processor to form the single frame comprise instructions that, when executed, cause the processor to form the single frame such that the one or more time slots representing a frame according to the first protocol are comprised in a data portion of the single frame.

10. The communication device as claimed in claim 9, wherein the instructions causing the processor to form the single frame comprise instructions that, when executed, cause the processor to form the single frame such that the entirety of the data portion comprises a series of contiguous time slots for communication according to the first protocol.

11. The communication device as claimed in claim 1, wherein the non-transitory computer readable medium further has stored thereon instructions that, when executed, cause the processor to transmit to the plurality of terminals an indication that a frame according to the second protocol has a frame according to the first protocol imposed onto it.

12. The communication device as claimed in claim 1, wherein the instructions causing the processor to form the single frame comprise instructions that, when executed, cause the processor to form the single frame such that a portion of the frame that comprises a header according to the second protocol is not interrupted by time slots representing one or more time slots according to the first protocol.

13. The communication device as claimed in claim 1, wherein non-transitory computer readable medium further has stored thereon instructions that, when executed, cause the processor to indicate to one or more terminals capable of communicating via the first protocol that they should ignore a part of the single frame comprising a header according to the second protocol.

14. The communication device as claimed in claim 1, wherein non-transitory computer readable medium further has stored thereon instructions that, when executed, cause the processor to communicate with the plurality of terminals via a wireless network that operates in white space.

15. The communication device as claimed in claim 1, wherein non-transitory computer readable medium further has stored thereon instructions that, when executed, cause the processor to communicate with the plurality of terminals via a wireless network that is configured for machine-to-machine communication.

16. The communication device as claimed in claim 1, wherein the first protocol is for the provision of broadband and the second protocol is for the provision of machine-to-machine communications.

17. A method for communicating with a plurality of terminals via a first communication protocol and a second communication protocol, wherein both protocols organize communications into a series of frames and the frames of the first protocol are shorter than those of the second protocol, the method comprising:

imposing two or more frames according to the first protocol onto at least part of a frame according to the second protocol to form a single frame for communicating via both protocols;

forming the single frame with one or more time slots representing the two or more frames according to the first protocol;

allocating the time slots representing a frame according to the first protocol to communications via either the first or the second protocol; and transmitting, within the single frame, data according to the first protocol and the second protocol, the single frame including a map having information describing an allocation of resources in the single frame to each of the plurality of terminals.

18. A communication terminal comprising:
a processor;
a non-transitory computer readable medium connected to the processor and having stored thereon instructions that, when executed, cause the processor to:
communicate via a machine-to-machine communication protocol and an internet communication protocol, the internet communications protocol using first frames, and the machine-to-machine communication protocol using second frames having a duration greater than a duration of at least two of the first frames in sequence; and
operate as a terminal for communications under the machine-to-machine protocol and as an access point for communications under the internet protocol by transmitting first data in one of the first frames and with second data in one of the second frames, wherein in two or more of the first frames are disposed completely within time slots of the one of the second frames, wherein each of the second frames includes a map having information describing an allocation of resources in the respective one of the second frames to each of the plurality of terminals.

19. The communication terminal as claimed in claim 18, wherein the machine-to-machine communication protocol is a Weightless protocol.

20. The communication terminal as claimed in claim 18, wherein the internet communications protocol is an IEEE 802.11 protocol.

* * * * *